Figure 1:
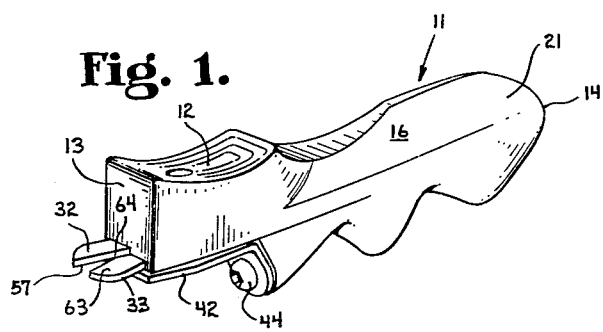

Sept. 22, 1964    J. W. HEINMILLER    3,149,506
TOOL FOR SHARPENING AND DE-BURRING AND THE LIKE
Filed March 12, 1962

INVENTOR.
JOSEPH HEINMILLER
BY
Lockwood, Woodard, Smith & Waikart
Attorneys

3,149,506
TOOL FOR SHARPENING AND DE-BURRING AND THE LIKE
Joseph W. Heinmiller, R.R. 3, Kokomo, Ind., assignor of one-half to Louise Crodian, Indianapolis, Ind.
Filed Mar. 12, 1962, Ser. No. 179,165
1 Claim. (Cl. 76—86)

This invention relates generally to tools and more particularly to tools which are not power operated and which have tool bits therein which make them particularly suitable for sharpening operations such as the sharpening of knives, and for de-burring operations on castings of the softer metals such as aluminum and magnesium.

De-burring operations are quite common in casting plants which manufacture aluminum and magnesium castings, as well as in manufacturing plants which use these castings in the manufacture of finished products. De-burring is also used in the plastics field both in the manufacture of molded or cast plastic parts, and in their finishing for use.

Many de-burring operations can be handled effectively and efficiently only by the use of hand tools of the unpowered variety. In many instances such tools are in the form of knives or files with the working element permanently secured to the handle. Naturally they become dull, particularly where used in de-burring the harder variety of cast materials, and frequently must be discarded after a relatively short period of use. Similarly, many conventional knife sharpeners, whether of the type held in the hand, or of the bench mounted type, seldom remain sharp for long and must be discarded after a relatively short period of use.

It is, therefore, a general object of the present invention to provide a tool of a type well suited for hand use or stationary mounting and which incorporates removable and replaceable tool bits.

It is a further object of the present invention to provide a tool in which the tool bits may be conveniently adjusted to maintain them in a sharp condition or to maintain a sharp working edge in position for effective employment of the tool.

It is a still further object of the present invention to provide a tool which may be conveniently provided with tool bits particularly well suited to sharpening operations, and in which the tool bits may be readily adjusted to maintain a sharp condition at the working portion of the working edges.

It is a still further object of the present invention to provide a tool capable of attaining the foregoing objects and characterized by comparatively simple but rugged construction and having a handle configuration especially well suited and comfortable to use in performing the assigned task of the tool.

Described briefly, a typical embodiment of the present invention has an elongated handle with a concave depression for receiving the thumb of the user and with a plurality of projections on the side opposite the thumb depression whereby the fingers may be comfortably, yet securely, engaged on the handle.

At the forward end of the handle is a receptacle for receipt of the tool bit or bits. A cam is provided engaging the tool bits whereby they can be advanced or moved outwardly from the handle to present fresh cutting or working edges as desired. The cam is provided with a hexagonal socket to receive an Allen wrench for turning the cam to attain the desired adjustment.

The full nature of the invention will be understood from the accompanying drawings and the following description and the claim.

Figure 2:
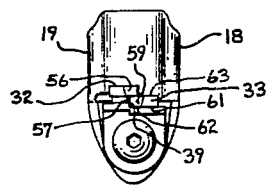
Figure 3:
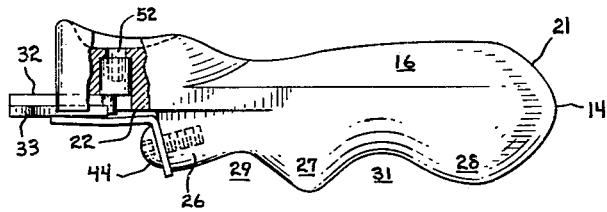
Figure 4:
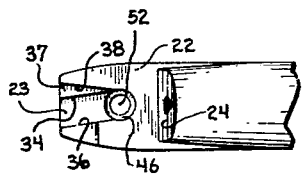
Figure 5:
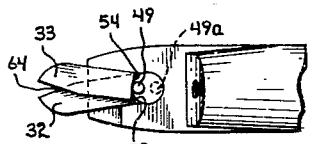
Figure 6:
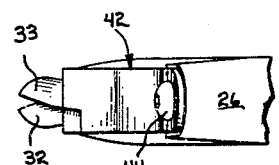
Figure 7:
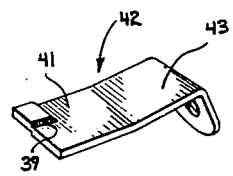
Figure 8:
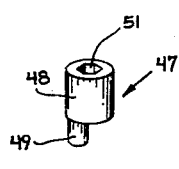
Figure 9:
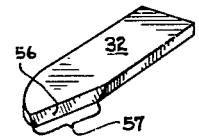

FIG. 1 is a frontal perspective view of a typical embodiment of the present invention.
FIG. 2 is a front elevation thereof.
FIG. 3 is a side elevation thereof, with a portion being broken away to illustrate details of the cam and tool bit arrangement.
FIG. 4 is a fragmentary bottom view of the handle of the present invention, with other parts being omitted to show details of the recess for receiving the tool bit.
FIG. 5 is a fragmentary bottom view of the frontal portion of the handle with the cam and a pair of tool bits in place.
FIG. 6 is a fragmentary bottom view of the frontal portion of the tool with the tool bit retaining clamp and screw in place.
FIG. 7 is a top frontal perspective view of the tool bit clamp.
FIG. 8 is a top perspective view of the cam.
FIG. 9 is a top frontal perspective view of one of the tool bits employed in the embodiment shown.

Referring to the drawing, the embodiment illustrated has tool bits intended principally for use as a sharpener, but it should, of course, be understood that other shapes and orientations of tool bits or a single tool bit may be employed within the scope of the invention.

In FIGS. 1 and 2, the generally elongated handle 11 has upper surfaces which include the generally concave thumb depression 12 extending from the forward end 13 of the handle toward the rear end 14 thereof. A pair of planar surfaces (surface 16 of the pair being shown and the other surface not shown) extend upwardly in converging relation from their origins at the side margins 18 and 19 respectively, of the handle. These surfaces begin at a point below and immediately to the rear of the thumb depression 12 and extend to the generally convex surface 21 at the rear of the handle. These generally planar surfaces provide convenient and out of the way surfaces upon which to place or locate cast-in identifying information such as the name of the tool, manufacturer, and the marketing agent.

The lower surfaces of the handle, part of which will be more readily apparent from FIG. 4, include a flat surface 22 at the forward end and extending toward the rear, and having a recess 23 therein to receive a tool bit. Face 24 extends downwardly from the face 22 and provides a surface to which the tool bit securing clamp may be secured. Extending between the face 24 and the rear end 14 of the handle, are a plurality of generally convex downwardly facing projections 26, 27 and 28, providing notches 29, 31 for receipt of fingers of the user of the tool.

Referring further to the drawings, tool bits 32 and 33 extend from the front end 13 of the handle. From FIG. 4, it will be apparent that recess 23 has parallel side walls 34 and 36, respectively. These side walls embrace the sides of the tool bit 32. Recess 37 has a side wall 38 which cooperates with the abutment 39 in the upper face 41 of the tool bit clamp 42, to engage the side surfaces of the tool bit 33. The tool bit clamp 42 being of a spring metal construction with the surface 41 and surface 43 being slightly non-coplanar, securely retains the tool bits 32 and 33 in the position shown when the clamp is secured to the handle by means of the screw 44.

A cylindrical recess 46 is provided in the handle and receives the cam 47 having a cylindrical body 48 and depending lug 49. The cam is provided with means for receiving a key or operating tool whereby the cam may be turned conveniently. In the illustrated embodiment, the means for receiving is a hexagonal recess 51 in the top of the cam, and access thereto is provided by the passageway 52 in the handle opening to the exterior of the handle in the thumb depression 12.

The cam is rotatable in the recess 46 and in the position shown in FIG. 5, the lug 49 engages the rear face 53 of the tool bit 32 and the rear face 54 of the tool bit 33. In this position of the cam, the tool bits are extended to their maximum degree of extension from the front of the handle. However, with the cam in the position indicated by the dotted outline 49a, the tool bits would be at their minimum extension from the front of the handle. Normally, in the use of the invention, this is the starting position of the assembly.

As illustrated in FIG. 9, a tool bit 32 has a face 56 ground thereon to provide a working edge 57 at the intersection of the face 56 and the underside (not shown) of the tool bit. A face 59 is ground on tool bit 33 and intersects the underside 61 of the tool bit to provide a working edge 62. It is apparent from FIG. 1, that the intersection of working edge 57 of the tool bit 32 with the upper face 63 of the tool bit 33 occurs at a point 64. It may be observed from FIG. 2, that the ground working faces of both tool bits are tapered in the same direction, i.e. they lie in convergent planes. Therefore, the working edges of both tool bits are at the underfaces thereof. With the tool bits so oriented, the cutting edge of a knife may be rested upon the working edges of the tool bits, and drawn upwardly with respect to the handle. Thus, the tool may be used as a knife sharpener.

As the portion of the cutting edges of the tool bits which works on the cutting edge of the knife becomes dull, the cam may be rotated so that the lug advances from the position indicated by the dotted outline 49a, to the position shown by the solid line to provide a fresh edge for the sharpening function. When the tool bits have been advanced to the position shown in FIG. 5, and the edges become dull, the tool bits may be removed for resharpening.

In addition to providing a convenient handy tool, the provision of hexagonal sockets in the clamp mounting screw 44 and in the cam 47, make possible the use of a single Allen wrench to provide the tool bit adjustments and replacements for the tool.

Obviously other shapes and configurations of tool bits can be employed according to the purposes and operations to be performed with the tool. Where the tool is intended strictly for stationary employment such as, for example, a bench mounted knife sharpener, the handle need not have the shape disclosed in the drawings herein. It may, for example, be rectangular in form and mounted directly to a bench. It will be understood, therefore, that while the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claim.

What is claimed is:

A tool comprising:

a body having recesses in a first frontal surface thereof to receive tool bits, one of said recesses having a pair of parallel side walls and a top wall to guide movement of a tool bit therein, another of said recesses having a side wall to guide movement of a tool bit therein, the side walls of said one recess and those of said another recess being oriented at angles with respect to each other;

a tool bit guidingly received in each of said recesses, each said tool bit having working edges extending from said body;

a tool bit retaining clamp secured to said body and having an abutment thereon to cooperate with the side wall of said another recess to guide movement of one of said tool bits, said recess walls and abutment orienting said tool bits in diverging relation at constant angular relationship to each other, with a working edge of one of said tool bits intersecting a face of another of said tool bits at a point;

and a cam in said recesses and simultaneously engaging said tool bits, said cam having means thereon for receiving an operating tool to operate said cam to move said tool bits in translation in said body to change the degree of extension from said body, of said working edges, said recess walls and abutment maintaining a constant angular relationship between said tool bits during translational movement thereof by said cam, whereby an intersection of a sharp portion of said working edges with said tool bit face is readily maintained.

References Cited in the file of this patent

UNITED STATES PATENTS

| | | |
|---|---|---|
| 50,951 | Porter | Nov. 14, 1865 |
| 103,705 | Belcher | May 31, 1870 |
| 375,773 | Rockwell | Jan. 3, 1888 |
| 950,530 | Dow | May 1, 1910 |
| 1,111,273 | Rybarsky | Sept. 22, 1914 |
| 2,121,718 | Sweetland | June 21, 1938 |

FOREIGN PATENTS

| | | |
|---|---|---|
| 133,470 | Australia | July 11, 1949 |